(12) United States Patent
Wittig et al.

(10) Patent No.: US 7,573,674 B1
(45) Date of Patent: Aug. 11, 2009

(54) STORAGE DISK HAVING INCREASED DAMPING CHARACTERISTICS IN A DISK DRIVE

(75) Inventors: Larry E. Wittig, Lexington, MA (US); Michael Mallary, Sterling, MA (US); Paul A. Keenan, Harrisville, RI (US); William Dale Robertson, Charlton, MA (US); Bernhard Hiller, San Jose, CA (US)

(73) Assignee: Maxtor Corporation, Longmont, CO (US)

( * ) Notice: Subject to any disclaimer, the term of this patent is extended or adjusted under 35 U.S.C. 154(b) by 533 days.

(21) Appl. No.: 11/314,515

(22) Filed: Dec. 20, 2005

Related U.S. Application Data

(60) Provisional application No. 60/639,046, filed on Dec. 23, 2004, provisional application No. 60/641,106, filed on Jan. 3, 2005, provisional application No. 60/658,906, filed on Mar. 4, 2005.

(51) Int. Cl.
  *B32B 3/00* (2006.01)
(52) U.S. Cl. .................................. 360/99.12
(58) Field of Classification Search ........................ None
  See application file for complete search history.

(56) References Cited

U.S. PATENT DOCUMENTS

| | | | | |
|---|---|---|---|---|
| 3,160,549 A | * | 12/1964 | Caldwell et al. | 428/317.3 |
| 4,195,713 A | * | 4/1980 | Hagbjer et al. | 188/268 |
| 5,183,863 A | * | 2/1993 | Nakamura et al. | 525/438 |
| 5,219,708 A | * | 6/1993 | Hirata et al. | 430/270.11 |
| 5,262,232 A | * | 11/1993 | Wilfong et al. | 428/327 |
| 5,356,715 A | * | 10/1994 | Levine et al. | 428/416 |
| 5,538,774 A | | 7/1996 | Landin et al. | |
| 6,064,547 A | | 5/2000 | Wittig et al. | |
| 6,285,525 B1 | | 9/2001 | McCutcheon et al. | |

* cited by examiner

*Primary Examiner*—Mark Blouin
(74) *Attorney, Agent, or Firm*—Shumaker & Sieffert, P.A.

(57) ABSTRACT

A disk drive includes a drive housing and a storage disk rotatably coupled to the drive housing. In one embodiment, the storage disk includes a first substrate, a spaced-apart second substrate, a damping layer and a rigid substrate spacer. The first substrate is formed from a first material having a first composition and the second substrate is formed from a second material having a second composition. The damping layer is positioned at least partially between the first substrate and the second substrate. The rigid substrate spacer is positioned at least partially between the first substrate and the second substrate, and is formed from a third material having a third composition that is different from the first composition and the second composition. In one embodiment, the first composition is different than the second composition. The first substrate has a first thickness and the second substrate has a second thickness that can be different than the second thickness. In another embodiment, the disk drive includes a disk clamp having an upper portion and a lower portion. The rigid substrate spacer can be at least partially positioned directly between the upper and lower portions.

54 Claims, 6 Drawing Sheets

STORAGE DISK HAVING INCREASED DAMPING CHARACTERISTICS IN A DISK DRIVE

RELATED APPLICATIONS

This Application claims the benefit on U.S. Provisional Application Ser. No. 60/639,046, filed on Dec. 23, 2004, U.S. Provisional Application Ser. No. 60/641,106, filed on Jan. 3, 2005, and on U.S. Provisional Application Ser. No. 60/658, 906, filed on Mar. 4, 2005. The contents of U.S. Provisional Application Ser. Nos. 60/639,046, 60/641,106 and 60/658, 906 are incorporated herein by reference.

BACKGROUND

Disk drives are widely used in computers, consumer electronics and data processing systems for storing information in digital form. The disk drive typically includes one or more head suspension assemblies and one or more storage disks. Each head suspension assembly includes a slider having an air bearing surface, and a read/write head that transfers information to and from the storage disk. Each storage disk typically includes a storage surface on each side of the storage disk. The storage surfaces are divided into a plurality of tracks that store data and/or other information used by the disk drive during operation.

The need to reduce data access times has led to increasing the rotational speed of the storage disks. Because of the increased speed, the rotating storage disks can generate significant air turbulence within the disk drive. Increased air turbulence can lead to unwanted vibration of the storage disks. For example, air turbulence can generate regions of low pressure near the storage disks, which are then filled by air rushing in because of the pressure differential. This repeated cycle causes chaotic and random flutter or wobble of the storage disks, resulting in disk vibration track misregistration (TMR).

In addition, in order to increase storage capacity, storage disks are being manufactured with increased track density, i.e. more tracks per inch. In conventional disk drives, each slider rides on an air bearing generated by rotation of the storage disk. The separation between the slider and the disk surface during rotation of the storage disk is referred to as the fly height. As track density increases, the fly height must necessarily decrease in order to maintain accuracy of the disk drive. Currently, fly heights can be on the order of 5 nanometers or less. A drawback of such low fly heights is that even slight vibration or imbalance of the storage disk can cause the slider to crash into the storage disk, resulting in loss of data and damage to the slider and/or damage to the storage disk.

Attempts to reduce vibration of the storage disk include manufacturing storage disks having greater thicknesses. However, a thicker disk can cause track misregistration due to the kinematic properties of the disk. More specifically, it is understood that in a comparison of two disks with different thicknesses, each having the same vibration amplitude, kinematic head-to-track offset during vibration has a direct correlation to the thickness of the storage disk. On the other hand, it is also acknowledged that a thinner disk is generally more susceptible to having a greater vibration amplitude, which typically results in an increase in the extent of track misregistration.

SUMMARY

The present invention is directed toward a disk drive that includes a drive housing and a storage disk that is rotatably coupled to the drive housing. In one embodiment, the storage disk includes a first substrate, a spaced-apart second substrate, a damping layer and a rigid substrate spacer. The first substrate is formed from a first material having a first composition and the second substrate is formed from a second material having a second composition. The damping layer is positioned at least partially between the first substrate and the second substrate. The rigid substrate spacer is positioned at least partially between the first substrate and the second substrate, and is formed from a third material having a third composition that is different from the first composition and the second composition.

In accordance with one embodiment, the first substrate has a first thickness and the second substrate has a second thickness that is substantially similar to the first thickness, while in another embodiment, the first thickness is different than the second thickness. In another embodiment, the first substrate has a first natural frequency and the second substrate has a second natural frequency that is different than the first natural frequency. In alternate embodiments, the first composition is substantially identical to the second composition, or the first composition can be different than the second composition. In another embodiment, the disk drive includes a disk clamp having an upper portion and a lower portion. In this embodiment, the rigid substrate spacer is at least partially positioned directly between the upper and lower portions. The rigid substrate spacer can be formed during a welding operation, or it can include an adhesive material or a metal material, for example.

In one embodiment, at least one of the substrates includes a recess near an inner diameter of the storage disk. The rigid substrate spacer is positioned at least partially within the recess to maintain a substantially consistent spacing between the first substrate and the second substrate.

In a further embodiment, the storage disk includes the first substrate formed from a first material having a first composition, the spaced-apart separately formed second substrate formed from a second material having a second composition and the damping layer including a viscoelastic material that is positioned at least partially between the first substrate and the second substrate. In this embodiment the first composition is different than the second composition.

The present invention is also directed toward a method for manufacturing a storage disk of a disk drive.

BRIEF DESCRIPTION OF THE DRAWINGS

The novel features of this invention, as well as the invention itself, both as to its structure and its operation, will be best understood from the accompanying drawings, taken in conjunction with the accompanying description, in which similar reference characters refer to similar parts, and in which.

DESCRIPTION

Figure 1:
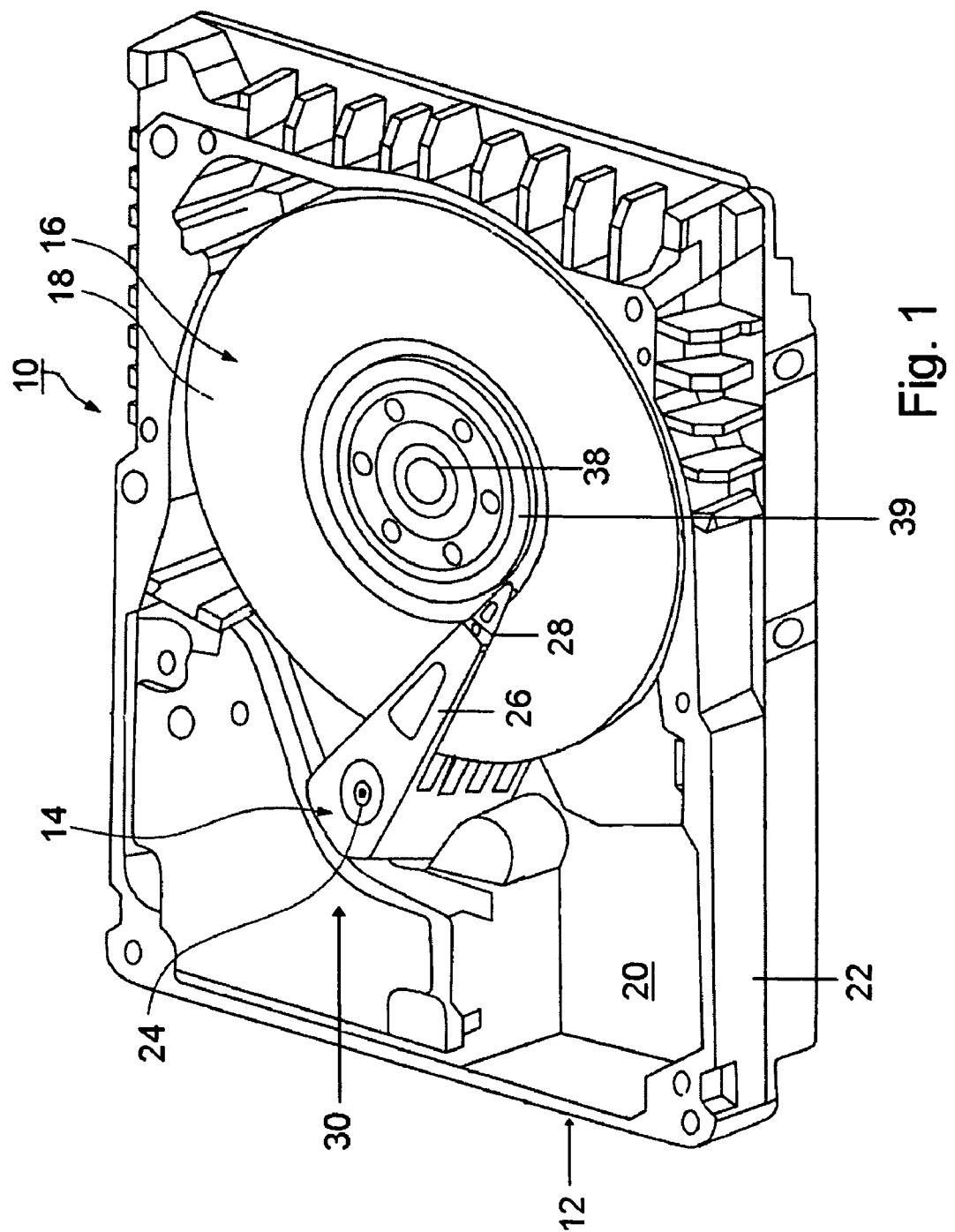
FIG. 1 is a simplified perspective view of a disk drive having features of the present invention.

Referring initially to FIG. 1, the disk drive 10 includes (i) a drive housing 12, (ii) a head stack assembly 14, and (iii) a disk assembly 16 having one or more storage disks 18. The drive housing 12 retains the various components of the disk drive 10. The drive housing 12 includes a housing base 20, four side walls 22, and a housing cover (not shown in FIG. 1 for clarity).

The head stack assembly 14 illustrated in FIG. 1 includes an actuator hub 24, a plurality of actuator arms 26, a plurality of head suspension assemblies 28 (only one head suspension assembly 28 is shown for clarity) and an actuator motor 30. The actuator motor 30 rotates the actuator hub 24 and the head suspension assemblies 28 relative to the storage disk 18. Only a portion of the actuator motor 30 is illustrated in FIG. 1.

Each head suspension assembly 28 typically includes a load beam (not shown), a flexure (not shown) and a slider (not shown). The load beam is secured to the actuator arm 26, and supports the slider proximate one side of the storage disk 18. The slider includes a slider that reads information from and writes information to the storage disk 18.

The disk assembly 16 includes a spindle assembly 38 and the storage disks 18. The spindle assembly 38 is rotatably mounted to the drive housing 12. The storage disks 18 are fixedly secured to the spindle assembly 38 that can include a disk clamp 39, for example. The spindle assembly 38 and the storage disks 18 are adapted to rotate at a predetermined angular velocity.

Figure 2:
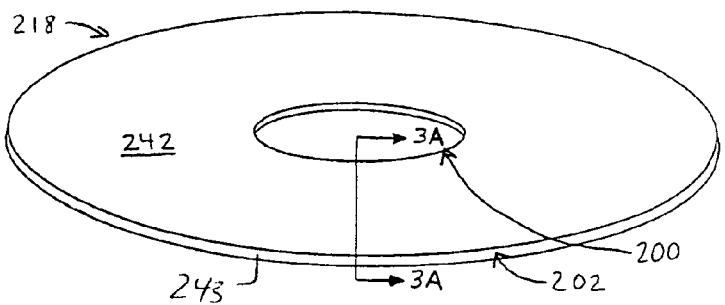
FIG. 2 is a perspective view of a storage disk having features of the present invention.

FIG. 2 is a perspective view of one embodiment of the storage disk 218. The storage disk 218 is generally annular in shape and stores data and other information in a form that can be subsequently retrieved and/or read. The storage disk 218 includes an inner diameter 200, an outer diameter 202, a first storage surface 242 and a substantially similar, opposed second storage surface 243. Alternatively, the second storage surface 243 can be different than the first storage surface 242.

The storage disk 218 is particularly suited to magnetically store data and other information. Moreover, as set forth in greater detail herein, the materials utilized in the storage disk 218 can include metals, ceramics, glass, plastics, other suitable materials, or combinations of these materials. In addition, the diameter of the storage disk 218 can vary. For instance, the storage disk 218 can have a diameter of approximately one inch, two and one half inches, three and one half inches, or any other suitable diameter depending upon the design requirements of the disk drive 10. The storage disk 218 can also have an inner diameter of ¼ inch, ½ inch, 1 inch, or any other suitable inner diameter depending upon the design requirements of the disk drive 10.

Figure 3A:
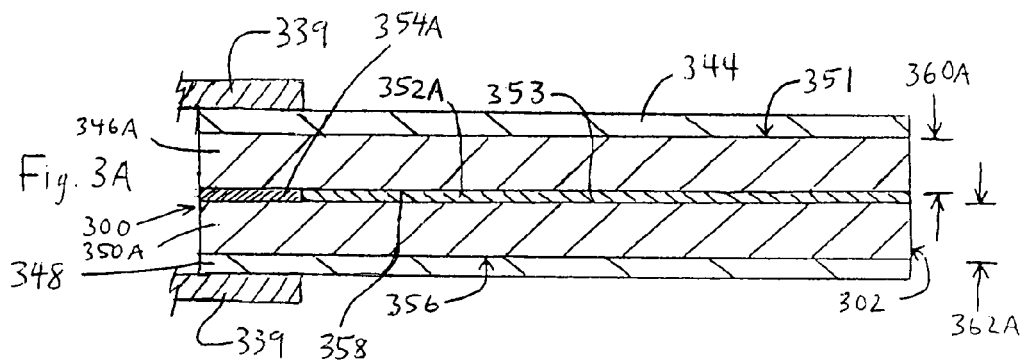
FIG. 3A is a partial cross-sectional view of one embodiment of the storage disk taken on line 3-3 in FIG. 2, and a disk clamp.

FIG. 3A is a cross-sectional view of a portion of a disk clamp 339 and a first embodiment of the storage disk 218 illustrated in FIG. 2. In the embodiment illustrated in FIG. 3A, the disk clamp 339 is positioned at the inner diameter 300 of the storage disk 318A. In a disk drive 10 having a single storage disk, the disk clamp 339 includes a top clamp portion and a bottom clamp portion that sandwich the storage disk 318A to couple the storage disk 318A to the spindle assembly 38 (illustrated in FIG. 1). The bottom clamp portion is generally a flange on a hub of the spindle motor. For example, for a single-disk disk drive 10, either portion of the disk clamp 339 illustrated in FIG. 3A could be the top clamp portion or the bottom clamp portion.

For a multi-disk disk drive 10, the disk clamp 339 includes a top clamp portion, a bottom clamp portion and a disk separator (also known as a spacer) that maintains a predetermined separation or spacing between adjacent storage disks. Depending upon the positioning of the storage disk 318A within the disk assembly 16 (illustrated in FIG. 1), the disk clamp 339 illustrated in FIG. 3A would include two of the top clamp portion, the bottom clamp portion and the disk separator. Any suitable disk clamp 339 known to those skilled in the art can be used with the present invention.

In this embodiment, the storage disk 318A includes a first outer region 344, a first substrate 346A, and a second outer region 348, a second substrate 350A, a damping layer 352A and a substantially rigid substrate spacer 354A (hereinafter sometimes referred to as a "substrate spacer"). The first outer region 344 is secured to the first substrate 346A, and the second outer region 348 is secured to the second substrate 350A. Although the outer regions 344, 348 illustrated in FIG. 3A are each shown as a single region, each outer region 344, 348 can include one or more layers of different materials that are sequentially built up or layered onto the respective substrate 346A, 350A. For instance, the layers can be sequentially added onto one another using plating or sputter depositing, as non-exclusive examples. The outer regions 344, 348 can be identical to one another, e.g. mirror images, or the outer regions 344, 348 can be different from one another. The layers within each outer region 344, 348 can have similar or varying thicknesses from one another.

In one non-exclusive example, one or both of the outer regions 344, 348 can include layers made from one or more of a nickel alloy (such as nickel-phosphorus, for example), a chromium alloy, a magnetic layer, an overcoat layer, a lubricating layer, etc. It should be noted that the outer regions 344, 348 are substantially less thick than the substrates 346A, 350A. For example, as set forth in greater detail below, the substrates 346A, 350A can each have a thickness on the order of hundreds (or even thousands) of microns, while the outer regions 344, 348 can each have a thickness of approximately ten microns or less. Thus, FIG. 3A is not shown to scale, but has been enhanced for ease of reference. It is also recognized that although the substrates 346A, 350A illustrated herein are shown to have squared edges at the inner diameter 300 and outer diameter 302, the edges can, and likely do, have other configurations. For example, in non-exclusive alternative embodiments, the edges of the substrates 346A, 350A can be rounded or beveled.

The first substrate 346A has a first outer surface 351 and a first inner surface 353. The second substrate 350A has a second outer surface 356 and a second inner surface 358. The first outer surface 351 contacts the first outer region 344, and the second outer surface 356 contacts the second outer region 348. At least a portion of the first inner surface 353 and at least a portion of the second inner surface 358 each contacts the damping layer 352A.

In the embodiment illustrated in FIG. 3A, the first substrate 346A has a first thickness 360A, and the second substrate 350A has a second thickness 362A that is substantially identical to the first thickness 360A. For example, with a storage disk 318A having a nominal thickness of 1.6 millimeters, each substrate 346A, 350A has a thickness 360A, 362A of approximately 0.8 millimeters. These measurements are provided as one example only, and it is recognized that any suitable thickness of the storage disk 318A can be used, either less than or greater than 1.6 millimeters, depending upon the size, type and/or requirements of the disk drive 10.

Additionally, in this embodiment, the first substrate 346A and the second substrate 350A are formed from substantially identical materials. For example, in one embodiment, the substrates 346A, 350A are formed primarily from aluminum. Alternatively, the substrates 346A, 350A can both be formed from one of ceramic, other metals and/or metal alloys, glass, plastic, or any other suitably rigid material that can support the outer regions 344, 348.

The damping layer 352A can include any suitable resilient and/or damping material, such as a viscoelastic material, for example. A viscoelastic material is one that is viscous, and therefore capable of dissipating energy, yet exhibits certain elastic properties, and therefore capable of storing energy. Such a material typically can be deformed, e.g., stretched, by an applied load and gradually regain its original shape, e.g., contract, sometime after the load has been removed. The damping layer 352A can be a liquid applied material or it can be a stock laminated sheet, as non-exclusive examples.

Suitable viscoelastic materials for use in the vibration damping materials of the present invention can have a loss factor, i.e., the ratio of energy loss to energy stored, of at least about 0.01. In alternative embodiments, the loss factor is at least about 0.1, about 0.5-10, or about 1-10, in the frequency and temperature range where damping is required (typically about 1-10,000 Hz and –40 degree to 100 degree C. This loss factor is a measure of the material's ability to dissipate energy and depends on the frequency and temperature experienced by the damping material.

Useful viscoelastic damping materials can be isotropic as well as anisotropic materials, particularly with respect to their elastic properties. As used herein, an "anisotropic material" or "nonisotropic material" is one in which the properties are dependent upon the direction of measurement. Suitable viscoelastic materials include urethane rubbers, silicone rubbers, nitrile rubbers, butyl rubbers, acrylic rubbers, natural rubbers, styrene-butadiene rubbers, and the like. Other useful damping viscoelastic materials include polyesters, polyurethanes, polyamides, ethylene-vinyl acetate copolymers, polyvinyl butyral, polyvinyl butyral-polyvinyl acetate copolymers, epoxy-acrylate interpenetrating networks and the like.

Examples of thermoplastic materials suitable for use as the vibration damping material in rotatable storage disks according to the present invention include, but are not limited to, those selected from the group consisting of polyacrylates, polycarbonates, polyetherimides, polyesters, polysulfones, polystyrenes, acrylonitrile-butadiene-styrene blockcopolymers, polypropylenes, acetal polymers, polyamides, polyvinyl chlorides, polyethylenes, polyurethanes, and combinations thereof.

In general, any suitable viscoelastic material can be used. The choice of viscoelastic material for a particular set of conditions, e.g., temperature and frequency of vibration, etc., is within the knowledge of one of skill in the art of viscoelastic damping. It is to be understood that blends of any of the foregoing materials can also be used.

In addition to the viscoelastic material, the damping layer 352A of present invention can include an effective amount of a fibrous and/or particulate material. Herein, an "effective amount" of a fibrous material or particulate is an amount sufficient to impart at least improvement in desirable characteristics to the viscoelastic material, without degrading the integrity of the rotatable storage disk in which the viscoelastic material is incorporated. The fibrous material can be in the form of fibrous strands or in the form of a fiber mat or web. The fibrous material can be composed of any material that increases the damping capability of the viscoelastic material. Examples of useful fibrous materials in applications of the present invention include metallic fibrous materials, such as aluminum oxide, magnesium, or steel fibers, as well as non-metallic fibrous materials, such as fiberglass.

In addition to those materials specifically set forth herein, it is recognized that the damping layer 352A can include any other materials known to those skilled in the art to dissipate vibration in storage disks and the like. Additionally, in one embodiment, an electrically conductive material is added to the damping layer 352A to facilitate a welding process, as described in greater detail below.

The thickness of the damping layer 352A can vary depending upon the design requirements of the storage disk 318A and the disk drive 10. In one embodiment, the damping layer 352A can have a thickness within the range of 0.002 mm to 0.5 mm. In non-exclusive alternative embodiments, the thickness of the damping layer 352A can be within the range of 0.02 mm to 0.15 mm, or 0.02 mm to 0.05 mm. In another embodiment, the thickness of the damping layer 352A can be approximately 0.5% to approximately 50% of the overall thickness of the storage disk 318A. In another embodiment, the thickness of the damping layer 352A can be less than 0.5% of the overall thickness of the storage disk 318A. Sufficient damping material should be used to obtain the desired damping effect while balancing the structural requirements of the storage disk 10.

The damping layer 352A may be continuous or discontinuous. A continuous damping layer 352A may include the same material or adjacent sections of different damping materials, for example. In another embodiment, a discontinuous damping layer 352A may include one or more sections of damping material separated by non-damping material and/or spaces, for example. It is recognized that although the damping layer 352A is illustrated in the Figures as being continuous and extending from the substrate spacer 354A to one of the inner diameter 300 or outer diameter 302, or between two substrate spacers, the damping layer 352A can be positioned at any region between the substrates 346A, 350A, or omitted from various regions between the substrates 346A, 350A.

In one embodiment, the substrate spacer 354A provides a predetermined spacing between at least a portion of the first substrate 346A and the second substrate 350A. The size, shape and positioning of the substrate spacer 354A can vary.

Figure 3B:
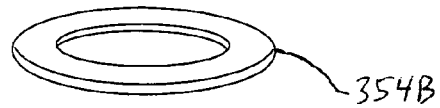
FIG. 3B is a perspective view of one embodiment of a substrate spacer.

For example, FIG. 3B illustrates one embodiment of the substrate spacer 354B. In this embodiment, the spacer 354B is ring-shaped or annular-shaped. In an alternative embodiment, the substrate spacer 354B can have a different configuration. For example, the substrate spacer 354B can be discontinuous or intermittently positioned between the first substrate 346A and the second substrate 350A, as described in greater detail below. Still alternatively, the storage disk 318A can include a plurality of substantially concentric substrate spacers, or a somewhat spiral-shaped substrate spacer.

In the embodiment illustrated in FIG. 3A, the substrate spacer 354A is positioned at or near the inner diameter 300 of the storage disk 318A. More specifically, in this embodiment, the substrate spacer 354A can be positioned so that at least a portion of the substrate spacer 354A is directly between the portions of the disk clamp 339. However, it is recognized that the substrate spacer 354A can be positioned in additional or alternative regions between the first substrate 346A and the second substrate 350A. For instance, the substrate spacer 354A can be additionally or alternatively positioned near the outer diameter 302, or at any suitable location between the inner diameter 300 and the outer diameter 302.

The thickness of the substrate spacer 354A can be varied to suit the design requirements of the storage disk 318A and the disk drive 10. In one embodiment, the uncompressed thickness of the substrate spacer 354A is substantially similar to the thickness of the damping layer 352A. In another embodiment, the thickness of the substrate spacer 354A under compression of the disk clamp 339 is substantially similar to the thickness of the damping layer 352A. In a further embodiment, the thickness of the substrate spacer 354A can be greater or less than the thickness of the damping layer 352A depending in part upon the shape of the substrates 346A, 350A, as provided in greater detail below. With these designs, the force exerted by the disk clamp 339 is exerted primarily, if not completely, on the substrate spacer 354A rather than on the damping layer 352A. Stated another way, squeezing, thinning or creeping of the viscoelastic material of the damping layer 352A over time is less likely to occur as a result of the clamp load exerted by the disk clamp 339 because this load acts substantially, if not completely, on the substrate spacer 354A.

The material used to form the substrate spacer 354A can vary. However, this material is sufficiently rigid so that the disk clamp 339 does not cause sufficient compression of the substrate spacer 354A, resulting in compression and/or thinning of the viscoelastic material of the damping layer 352A. In one embodiment, the material used to form the substrate spacer 354A has a Young's modulus that is at least approximately 10% greater than the material used for the damping layer 352A. In non-exclusive alternative embodiments, the material used to form the substrate spacer 354A has a Young's modulus that is at least approximately 50%, 100%, 500%, 1,000% or 10,000% greater than the material used for the damping layer 352A. For example, the material used to form the substrate spacer 354A can include metals and metal alloys, ceramics, glass, epoxy, carbon fiber or other carbon-based substances, plastics or any other suitably rigid materials.

Further, in one embodiment, the material used to form the substrate spacer 354A is different than the material(s) used to form the substrates 346A, 350A. For example, the material used to form the substrate spacer 354A can be selected to improve bonding or plating considerations onto one or both of the substrates 346A, 350A. In another embodiment, the material used to form the substrate spacer 354A can have a slightly lower Young's modulus than the material used to form one or more of the substrates 346A, 350A.

For example, in one embodiment, the material used to form the substrate spacer 354A can have a Young's modulus that is less than approximately 99.9% of the Young's modulus for the material used to form one or both of the substrates 346A, 350A. In non-exclusive alternative embodiments, the material used to form the substrate spacer 354A has a Young's modulus that is less than approximately 99%, 95%, 90%, 75%, 50%, 25% or 10% of the Young's modulus for the material used to form at least one of the substrates 346A, 350A. With this design, under clamp load, the substrates 346A, 350A will compress to a lesser extent, if at all, relative to the substrate spacer 354A. Alternatively, the Young's modulus of the substrate spacer 354A can be equal to or greater than the Young's modulus of one or both of the substrates 346A, 350A. However, as previously provided, the Young's modulus of the substrate spacer 354A is substantially greater than that of the damping layer 352A.

The storage disk 318A provided herein can be manufactured in many different ways. For example, in one embodiment, the first substrate 346A is coated on one side with the viscoelastic material of the damping layer 352A. This can be accomplished by using a stock laminated material or liquid applied viscoelastic material. Prior to or subsequent to the application of the damping layer 352A, the substrate spacer 354A can be deposited or otherwise secured to the first substrate 346A at the appropriate location, i.e. at or near the inner diameter 300, outer diameter 302 or other suitable location. The second substrate 350A is then coupled to the first substrate 346A, i.e. by connecting, welding, or otherwise adhering, so that the damping layer 352A and the substrate spacer 354A are sandwiched between the substrates 346A, 350A. The layers of both the first outer region 344 and the second outer region 348 are then sequentially layered onto the respective substrates 346A, 350A so that layers common to both the first outer region 344 and the second outer region 348 can be added substantially simultaneously, e.g., during the same manufacturing step.

Alternatively, after the first substrate 346A and the second substrate 350A are coupled together as provided above, the first outer region 344 is first layered onto the first substrate 346A. Following this step, the second outer region 348 is layered onto the second substrate 350A.

In yet another embodiment, the first outer region 344 is layered onto the first substrate 346A, and the second outer region 348 is layered onto the second substrate 350A prior to the first substrate 346A and the second substrate 350A being coupled together. Further, any other suitable manufacturing methods can be used to effectuate the finished product described herein. For the embodiments which follow, the above method can be modified as required to carry out the intent of the present invention as provided herein.

Figure 3C:
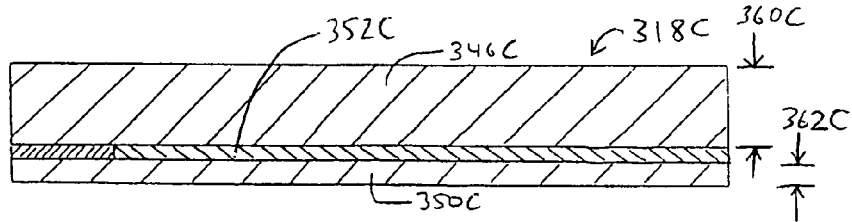
FIG. 3C is a partial cross-sectional view of another embodiment of a portion of the storage disk.

FIG. 3C is a cross-sectional view of another embodiment of the storage disk 318C. In this and other embodiments described hereinafter, the outer regions 344, 348 (illustrated in FIG. 3A) have been omitted for clarity because the outer regions 344, 348 remain substantially as previously described. It is recognized, however, that the storage disks as ultimately manufactured include one or both outer regions 344, 348 in the final product.

In the embodiment illustrated in FIG. 3C, the first substrate 346C has a first thickness 360C, and the second substrate 350C has a second thickness 362C that is different than the first thickness 360C. For example, in one embodiment, the first thickness 360C is at least approximately 0.1% greater than the second thickness 362C. In non-exclusive alternative embodiments, the first thickness 360C is at least approximately 0.5%, 1%, 2%, 5%, 10%, 25%, 50%, 100%, 200%, 300% or greater than 300% greater than the second thickness 362B. Still alternatively, the first thickness 360C can greater than 0%, but less than approximately 0.1% greater than the second thickness 362C.

As provided below, because of the difference in thickness between the first substrate 346C and the second substrate 350C, each substrate 346C, 350C has a different natural frequency of vibration. The difference in natural frequencies, in conjunction with the inclusion of the damping layer 352C, provides an increased damping effect on vibration of the storage disk 318C. Stated another way, in addition to the effect of the damping material in the damping layer 352C, one substrate 346C inhibits vibration of the other substrate 350C as a result of the different natural frequencies of vibration, resulting in an overall decrease in the vibration amplitude. With this design, vibration track misregistration is reduced.

Figure 3D:
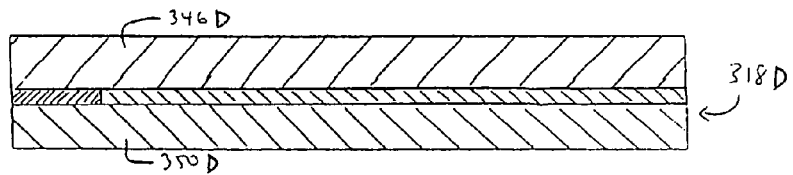
FIG. 3D is a partial cross-sectional view of yet another embodiment of a portion of the storage disk.

FIG. 3D is a cross-sectional view of an alternative embodiment of the storage disk 318D. In this embodiment, the first substrate 346D is formed from a first material having a first specific modulus and the second substrate 350D is formed from a second material having a second specific modulus that is different than the first specific modulus. For example, in one embodiment, the first specific modulus is at least approximately 0.1% greater than the second specific modulus. In non-exclusive alternative embodiments, the first specific modulus is at least approximately 0.5%, 1%, 2%, 5%, 10%, 25%, 50%, 100%, 200% or greater than 200% greater than the second specific modulus. Still alternatively, the first specific modulus can greater than 0%, but less than approximately 0.1% greater than the specific modulus.

As provided below, because of the difference in specific modulus between the first substrate 346D and the second substrate 350D, each substrate 346D, 350D has a different natural frequency of vibration. Similar to previously described embodiments, the difference in natural frequencies provides a damping effect on vibration of the storage disk 318D.

Figure 3E:
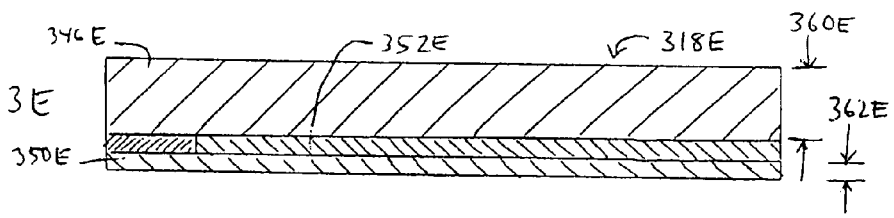
FIG. 3E is a partial cross-sectional view of still another embodiment of a portion of the storage disk.

FIG. 3E is a cross-sectional view of an alternative embodiment of the storage disk 318E. In this embodiment, the first substrate 346E has a first thickness 360E, and the second substrate 350E has a second thickness 362E that is different than the first thickness 360E. Further, the first substrate 346E is formed from a first material having a first specific modulus and the second substrate 350E is formed from a second material having a second specific modulus that is different than the first specific modulus. Somewhat similar to the embodiments in FIGS. 3C and 3D, the different thicknesses, the different specific moduli and the damping layer 352E for the embodiment illustrated in FIG. 3E combine to cause an increased damping of vibration of the storage disk 318E.

In the embodiments illustrated in FIGS. 3F-3M, the substrates can be formed to have identical or different thicknesses, and/or identical or different specific moduli, as described previously relative to FIGS. 3A and 3C-3E. For the sake of simplicity only, FIGS. 3F-3M show substrates having both identical thickness and identical specific moduli (represented by the similar cross-hatching). However, it is recognized that the appearance of the storage disk in the Figures is not intended to limit the scope of the present invention in this manner, and that any thickness differential or specific modulus differential can be utilized with the storage disks provide herein.

Figure 3F:
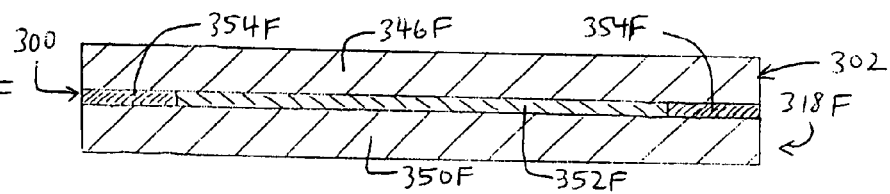
FIG. 3F is a partial cross-sectional view of a further embodiment of a portion of the storage disk.

FIG. 3F is a cross-sectional view of an alternative embodiment of the storage disk 318F. In this embodiment, the storage disk 318F includes a plurality of substrate spacers 354F. In this embodiment, one of the substrate spacers 354F is positioned at or near the inner diameter 300, and a second substrate spacer 354F is positioned at or near the outer diameter 302. Both substrate spacers are positioned between the substrates 346F, 350F. The damping layer 352F is positioned between the substrate spacers 354F and also between the substrates 346F, 350F.

Figure 3G:
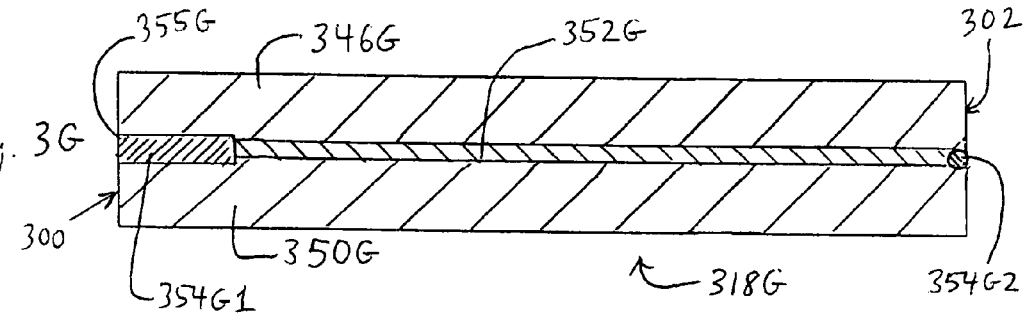
FIG. 3G is a partial cross-sectional view of an alternative embodiment of a portion of the storage disk.

FIG. 3G is a cross-sectional view of an alternative embodiment of the storage disk 318G. In this embodiment, the storage disk 318G includes a first substrate spacer 354G1 and a second substrate spacer 354G2. The first substrate spacer 354G1 is similar to the substrate spacers previously described. However, in this embodiment, the first substrate spacer 354G1 has a thickness that is somewhat greater than the thickness of the damping layer 352G.

Further, in this embodiment, the manufacturing of the storage disk 318G can be altered somewhat from those previously described. For example, the substrates 346G, 350G and the damping layer 352G can be assembled as previously described. However, in one embodiment, a portion of at least one of the substrates 346G, 350G at the inner diameter 300 is machined away to leave a recess 355G, which is subsequently filled with the material that forms the first substrate spacer 354G1. In this embodiment, for example, the first substrate spacer 354G1 can be an adhesive material such as epoxy as one non-exclusive example, or another suitable material that can be positioned at or near the inner diameter 300 (between the portions of the disk clamp 339 illustrated in FIG. 3A) in the recess 355G left following the machining operation described above. Still alternatively, the substrates 346G, 350G can be cut from large sheets of laminated sheet stock, and the first substrate spacer 354G1 and/or the second substrate spacer 354G2 can be added at a later time.

The second substrate spacer 354G2 can include a connector that contacts and is positioned between the first substrate 346G and the second substrate 350G. The second substrate spacer 354G2 can extend at least partially around a circumference of the storage disk 318G to reduce the likelihood that contaminants could penetrate between the substrates 346G, 350G, either during or following manufacture of the storage disk 318G. Further, any contaminants that did penetrate between the substrates 346G, 350G would not be able to be released therefrom into the rest of the disk drive 10 at a later time because of the seal formed by the second substrate spacer 354G2. Further, the second substrate spacer 354G2 can inhibit separation between the substrates 346G, 350G, and the damping layer 352G, which could potentially otherwise occur over time. Moreover, the second substrate spacer 354G2 can inhibit outgassing from between the substrates 346E, 350E during certain vacuum processing steps that can occur during manufacturing.

In non-exclusive alternative embodiments, the second substrate spacer 354G2 extends at least approximately 1%, 5%, 10%, 25%, 50%, 75%, 90% or 100% around a circumference of the storage disk 318E. Still alternatively, the second substrate spacer 354G2 can be either continuous or discontinuous. Moreover, in the embodiment illustrated in FIG. 3G, the second substrate spacer 354G2 extends at least partially around the storage disk 318G at or near the outer diameter 302. In an alternative embodiment, the second substrate spacer 354G2 can be positioned in varying locations along a radial direction of the storage disk 318G.

In one embodiment, the second substrate spacer 354G2 can include an epoxy-type material or another adhesive. Alternatively, the second substrate spacer 354G2 can be in the form of a weld. In still other alternative embodiments, the second substrate spacer 354G2 can include any other suitable material or technique that is compatible with subsequent disk processing, both during and after manufacture.

Figure 3H:
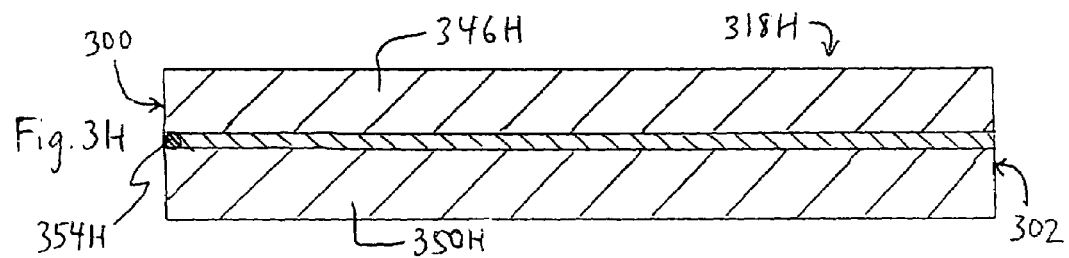
FIG. 3H is a partial cross-sectional view of yet another alternative embodiment of a portion of the storage disk.

FIG. 3H is a cross-sectional view of an alternative embodiment of the storage disk 318H. In this embodiment, the storage disk 318H includes a substrate spacer 354H that contacts the first substrate 346H and the second substrate 350H at or near the inner diameter 300 of the storage disk 318H. The composition and configuration of the substrate spacer 354H can be substantially similar to the second substrate spacer 354G2 including a connector that is described above relative to FIG. 3G.

It is recognized that a plurality of connectors can be utilized with a single storage disk 318H. In one non-exclusive example, the storage disk 318H can have a connector at the inner diameter 300, and another connector at the outer diameter 302.

Figure 3I:
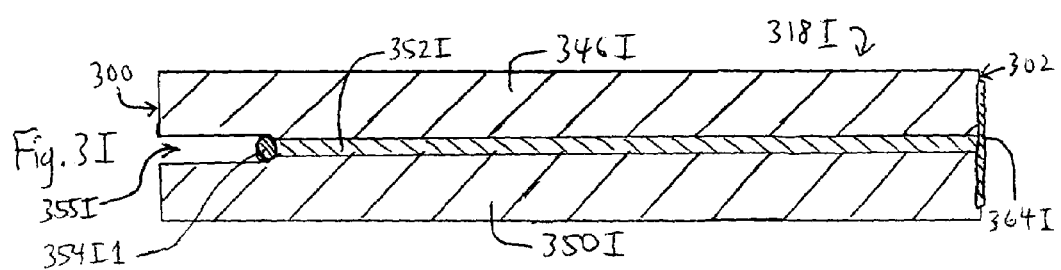
FIG. 3I is a partial cross-sectional view of still another alternative embodiment of a portion of the storage disk.

FIG. 3I is a cross-sectional view of an alternative embodiment of the storage disk 318I. In this embodiment, the storage disk 318I includes a substrate spacer 354I and an edge connector 364I. The substrate spacer 354I can be positioned following a machining process described previously relative to the embodiment in FIG. 3G, which results in the formation of a recess 355I near the inner diameter 300. In this embodiment, the substrate spacer 354I can be a spot weld or any material that is deposited between the substrates 346I, 350I to maintain a substantially consistent spacing between the substrates 346I, 350I, thereby protecting the integrity of the damping layer 352I. The material deposited to form the substrate spacer 354I can be continuous, e.g., annular, or it can be intermittent and discontinuous.

The edge connector 364I contacts the first substrate 346I and the second substrate 350I. The edge connector 364I illustrated in FIG. 3I includes a flexible band that is at least partially positioned around the outer diameter 302 of the storage disk 318I. The edge connector 364I can be formed from any suitable material that is flexible enough to flex during vibration of the storage disk 318I without becoming detached from the substrates 346I, 350I. The edge connector 364 can decrease the likelihood that contaminants can penetrate between the substrates 346I, 350I.

Figure 3J:
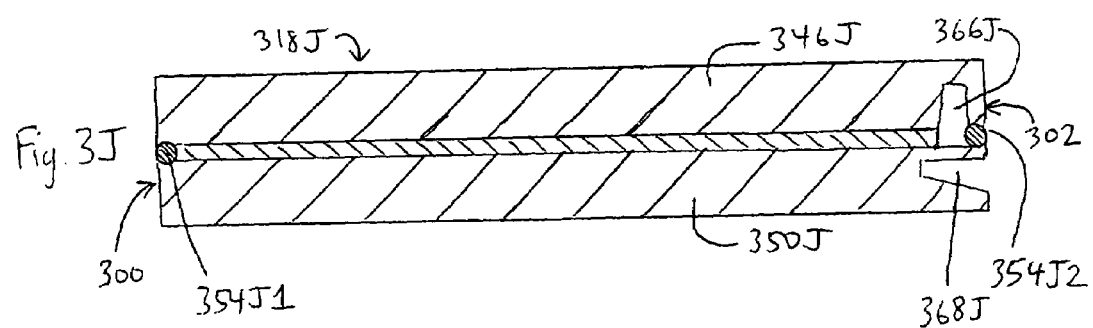
FIG. 3J is a partial cross-sectional view of another embodiment of a portion of the storage disk.

FIG. 3J is a cross-sectional view of an alternative embodiment of the storage disk 318J. In this embodiment, the storage disk 318J can include one or more substrate spacers 354J1, 354J2 that are substantially similar to the substrate spacers previously described herein. However, in this embodiment, the storage disk can also include one or more depressions 366J in at least one of the inner surfaces 353J, 358J of the substrates 346J, 350J, and/or one or more notches 368J along the outer diameter 302 of at least one of the substrates 346J, 350J.

Each depression 366J can extend at least partially, if not fully, around a circumference of the storage disk 318J. In one embodiment, for example, the depression 366J is generally annular in shape. The size and positioning of the depression 366J can allow the inner surfaces 353J, 358J of the substrates 346J, 350J to have increased movement relative to one another, which facilitates a greater degree of vibration damping of the storage disk 318J. Stated another way, the positioning of the depression 366J relative to the outer diameter 302 can result in less structural rigidity near the outer diameter 302, for example. As a result, the substrates 346J, 350J are more lightly coupled to one another, allowing a greater relative movement between the substrates 346J, 350J, which facilitates a greater degree of vibration damping of the storage disk 318J.

The depression 366J can be a continuous groove-type configuration, or the depression 366J can be in the form of multiple intermittent or discontinuous notches or grooves in the substrate 346J, 350J. Although the depression 366J illustrated in FIG. 3J are shown near the outer diameter 302, the depression 366 can be positioned near the inner diameter 300, or at any radial location along the storage disk 318J.

The depression 366J can have any suitable dimensions. For example, in one embodiment, the depression can have a depth of at least approximately 100 microns, and a width of at least approximately 100 microns. It is recognized, however, that these dimensions are provided as one non-exclusive example for ease of discussion only, and they are not intended to limit the scope or dimensions of the present invention in any manner.

The notch 368J can extend at least partially, if not fully, around the circumference of the storage disk 318J. In one embodiment, for example, the notch 368J is generally annular in shape. The size and positioning of the notch 368J can allow the inner surfaces 353J, 358J of the substrates 346J, 350J to have increased movement relative to one another, which facilitates a greater degree of vibration damping of the storage disk 318J. In other words, in this embodiment, the notch allows the substrates 346J, 350J to be more lightly coupled to one another, which facilitates a greater degree of vibration damping of the storage disk 318J.

The notch 368J can be a continuous groove-type configuration, or the notch 368J can be in the form of multiple intermittent or discontinuous notches or grooves in the substrate 346J, 350J. The notch 368J can have any suitable dimensions. For example, in one embodiment, the notch 368J can have a depth of at least approximately 500 microns, and a width of at least approximately 500 microns. It is recognized, however, that these dimensions are provided as one non-exclusive example for ease of discussion only, and they are not intended to limit the scope or dimensions of the present invention in any manner.

Figure 3K:
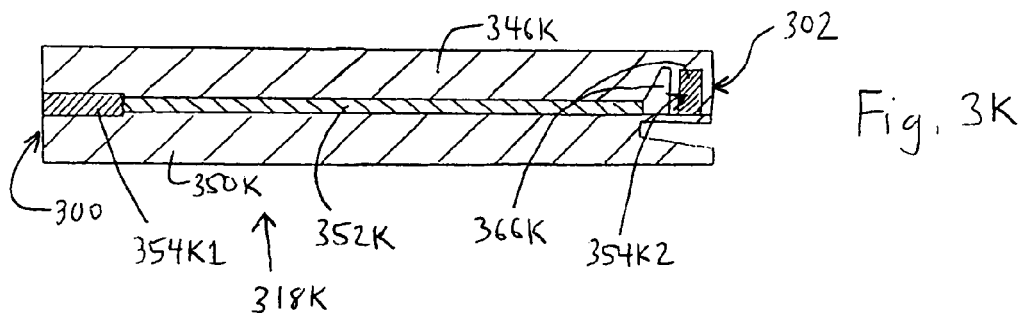
FIG. 3K is a partial cross-sectional view of another embodiment of a portion of the storage disk.

FIG. 3K is a cross-sectional view of an alternative embodiment of the storage disk 318K. In this embodiment, the storage disk 318K includes a first substrate spacer 354K1 and a second substrate spacer 354K2. The first substrate spacer 354K1 can be similar to one of the substrate spacers previously described. In this embodiment, the first substrate spacer 354K1 is positioned near the inner diameter 300 of the storage disk. The second substrate spacer 354K2 is positioned near the outer diameter.

More specifically, in this embodiment, the second substrate spacer 354K2 is positioned within one or more depressions 366K that is somewhat similar to the depression 366J (illustrated in FIG. 3J) previously described. The second substrate spacer 354K2 can include a material that partially or completely fills at least one of the depressions 366K. For example, in one embodiment, the second substrate spacer includes an epoxy material that secures the first substrate 346K to the second substrate 350K near the outer diameter 302. With this design, the inner diameter 300 and the outer diameter 302 of the substrates 346K, 350K are sealed, and the substrates 346K, 350K are lightly coupled to one another, allowing the substrates 346K, 350K to act against each other to decrease overall vibration of the storage disk 318K.

Figure 3L:
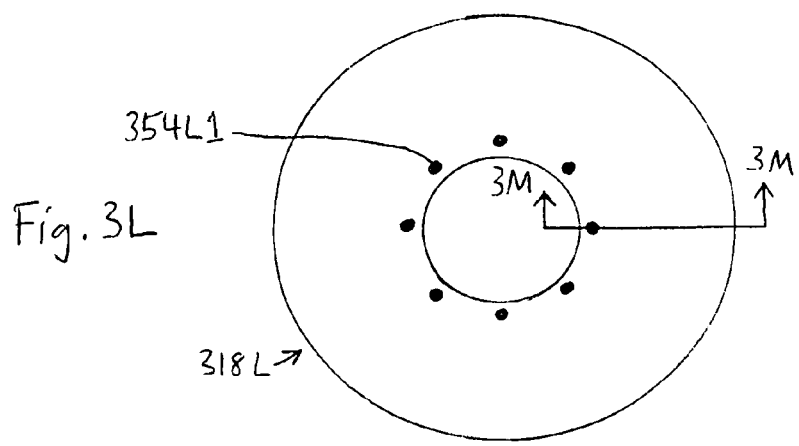
FIG. 3L is a top view of another embodiment of the storage disk having features of the present invention.

FIG. 3L is a top view of another embodiment of the storage disk 318L. In this embodiment, the storage disk 318L includes one or more substrate spacers 354L1 that are positioned near the inner diameter 300, substantially directly between the portions of the disk clamp 339 (illustrated in FIG. 3A). The number of substrate spacers 354L1 can be varied depending upon the requirements of the storage disk 318L, i.e. the size of the storage disk 318L and the extent of vibration damping to be mitigated.

Figure 3M:
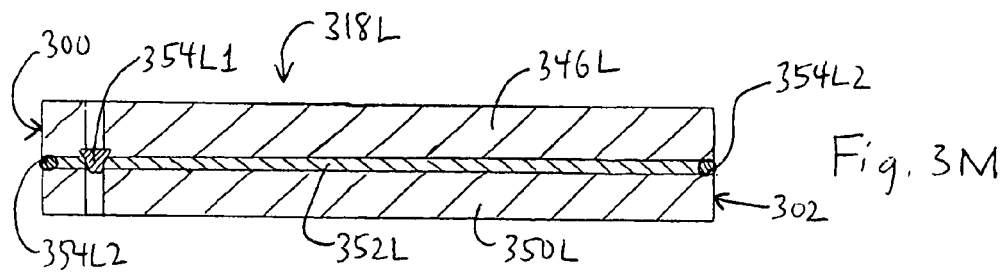
FIG. 3M is a partial cross-sectional view of one embodiment of a portion of the storage disk taken on line 3M-3M in FIG. 3L.

FIG. 3M is a cross-sectional view of a portion of the storage disk 318L illustrated in FIG. 3L. As illustrated in FIG. 3M, the storage disk 318L includes one or more substrate spacers 354L1, which can include material from a welding operation such as a spot weld, for example. The substrates 346L, 350L and the damping layer 352L can be coined through prior to welding to better allow the weld to couple the substrates 346L, 350L to one another. These and other types of substrate spacers described herein inhibit relaxation of the damping layer 352L as well as reducing the likelihood of squeezing or compression of the damping material which would otherwise potentially allow the damping material to extrude from between the substrates 346L, 350L. In other words, the substrate spacer 354L maintains a substantially consistent spacing between the substrates 346L, 350L to retain the damping layer 352L.

Additionally, although not required to effectuate the intent of the present invention, the storage disk 318L can also include one or more additional substrate spacers 354L2, such as connectors at the inner diameter 300 and/or outer diameter 302 of the storage disk 318L.

Figure 4A:
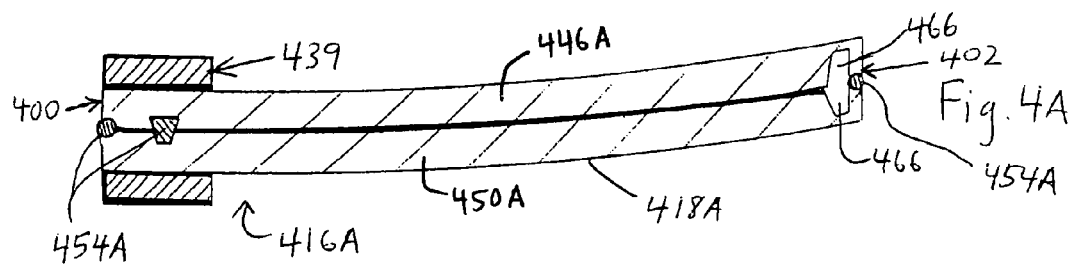
FIG. 4A is a simplified cross-sectional view of a portion of one embodiment of a disk assembly during vibration.
Figure 4B:
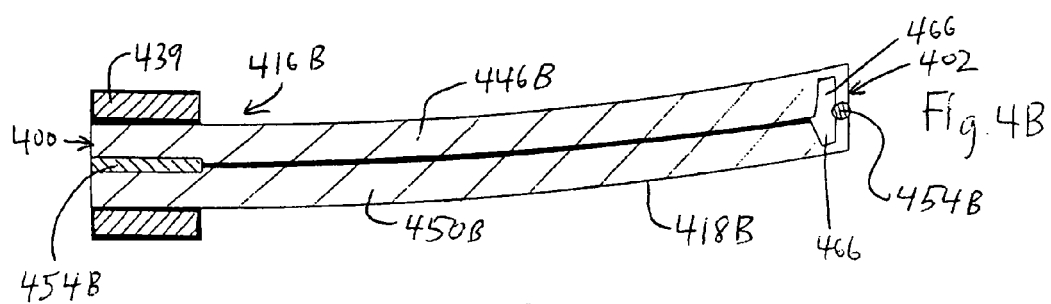
FIG. 4B is a simplified cross-sectional view of a portion of another embodiment of the disk assembly during vibration.

FIGS. 4A and 4B illustrate cross-sections of two additional embodiments of the storage disk 418A, 418B during vibration. FIG. 4A is a simplified representation of a portion of the disk assembly 416A including a disk clamp 439 and one embodiment of a portion of the storage disk 418A having features of the present invention. In this embodiment, the storage disk 418A is shown during vibration. The vibration has been exaggerated for clarity. The storage disk 418A in FIG. 4A includes a first substrate 446A and a second substrate 450A that are substantially similar to those previously described herein. The storage disk 418A also includes one or more substrate spacers 454A that are substantially similar to those previously described. Further, in this embodiment, each of the substrates 446A, 450A includes a depression 466A that is substantially similar to the depressions previously described. FIG. 4A illustrates how the first substrate 446A moves relative to the second substrate 450A. By securing the substrates 446A, 450A at or near the inner diameter 400 and/or the outer diameter 402, the remaining portions of the substrates 446A, 450A can move relative to one another, which results in decreased vibration of the storage disk 418A as a whole.

FIG. 4B is a simplified representation of a portion of the disk assembly 416B including a disk clamp 439 and one embodiment of a portion of a storage disk 418B having features of the present invention. In this embodiment, the storage disk 418B is shown during vibration. The vibration has been exaggerated for clarity. The storage disk 418B in FIG. 4B includes a first substrate 446B and a second substrate 450B that are substantially similar to those previously described herein. The storage disk 418B also includes one or more substrate spacers 454B that are substantially similar to those previously described. Further, in this embodiment, each of the substrates 446B, 450B includes a depression 466B that is substantially similar to the depressions previously described. FIG. 4B illustrates how the first substrate 446B moves relative to the second substrate 450B. By securing the substrates 446B, 450B at or near the inner diameter 400 and/or the outer diameter 402, the remaining portions of the substrates 446B, 450B can move relative to one another, which results in decreased vibration of the storage disk 418B as a whole.

Additionally, FIGS. 4A and 4B show one of the kinematic benefits to incorporating two substrates that move relative to one another into a storage disk. In a conventional storage disk, the amount that a track on the storage disk displaces during vibration is equal to the slope of the storage disk due to vibration times one half the thickness of the storage disk. However, with the present invention, this relation changes to the extent that the amount that the track on the storage disk displaces during vibration is equal to the slope of the storage disk due to vibration times one half the thickness of the substrate nearest the slider. Because the substrates in the storage disk provided herein are thinner than the thickness of the entire storage disk, the amount of displacement of the track is decreased.

It is recognized that any number of substrates can be included in the storage disk in accordance with the present invention, provided the storage disk can be cost effectively manufactured, and the number of substrates does not unduly increase the overall thickness of the storage disk, which can create space issues within the disk drive.

It is further recognized that although a number of different embodiments have been illustrated and described herein, the embodiments are not intended to be limiting in any manner. For example, it is understood that certain features from the embodiments provided herein can be combined with other features provided herein to yield other embodiments that are not explicitly illustrated or described. Because of the great number of potential combinations using the features provided herein, it would be unreasonable and oppressive, if not impossible, to identify and describe every possible embodiment that satisfies the intent of the present invention.

Figure 5:
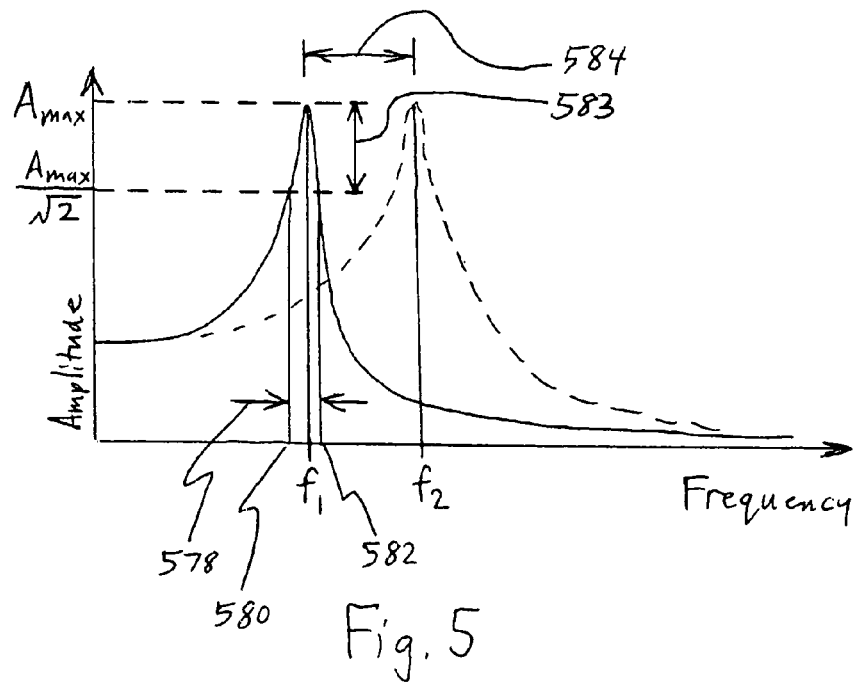
FIG. 5 is a graph illustrating frequency of vibration as a function of amplitude, in relation to the half power bandwidth for a plurality of thicknesses of substrates for the storage disk.

FIG. 5 is a graphical representation of frequency of vibration versus amplitude for the first substrate 346C (illustrated in FIG. 3C, for example) and for the second substrate 350C (illustrated in FIG. 3C, for example). In this example, the substrates 346C, 350C have different thicknesses. FIG. 5 also shows how a half-power bandwidth for the first substrate 346C is determined, which is a measure of the damping effect of a structure. The half-power bandwidth is determined by dividing the maximum or peak amplitude of vibration (which occurs at a natural frequency $f_1$) for the first substrate 346B by the square root of two, which provides two points corresponding to the half-power frequency points 580, 582. On a logarithmic scale, the two half-power points 580, 582 are obtained by going down 3 dB (illustrated by arrow 583) from the peak. The half-power bandwidth is a function of the frequency differential 578 between these two points 580, 582.

In one embodiment of the storage disk (for example, 318C in FIG. 3C), the thickness differential between the first substrate 346C and the second substrate 350C is determined by looking at the natural frequency $f_1$, $f_2$ for each respective substrate 346C, 350C. The thickness differential between the substrates 346C, 350C is proportional to the natural frequency differential 584 between the substrates 346C, 350C. Further, in one such embodiment, the natural frequency differential 584 between the substrates 346C, 350C is at least approximately the half-power bandwidth for one of the substrates 346C, 350C times the natural frequency of that substrate 346C, 350C, which is equal to the half-power bandwidth frequency differential 578.

In non-exclusive, alternative embodiments, the natural frequency differential 584 between the substrates 346C, 350C is at least approximately two, five or ten times the half-power bandwidth frequency differential 578. In still alternative embodiments, the natural frequency differential 584 between the substrates 346C, 350C is at least approximately 0.5%, 1%, 2%, 5%, 10% or 25%.

Further, the specific modulus of the first substrate 346D (illustrated in FIG. 3D) and the second substrate 350D (illustrated in FIG. 3D) is proportional to the square of the natural frequency for each respective substrate 346D, 350D. Thus, in determining the materials to be used for the substrates 346D, 350D, in one embodiment, the difference of the squares of the specific modulus for each of the substrates 346D, 350D should be at least approximately the half-power bandwidth for one of the substrates 346D, 350D times the natural frequency of that substrate 346D, 350D, which is equal to the frequency differential 578.

In non-exclusive, alternative embodiments, the specific modulus differential between the substrates 346D, 350D should be at least approximately two, five or ten times the half-power bandwidth frequency differential 578.

While the particular storage disk 18 and disk drive 10 as herein shown and disclosed in detail, are fully capable of obtaining the objects and providing the advantages herein before stated, it is to be understood that it is merely illustrative of the presently preferred embodiments of the invention and that no limitations are intended to the details of construction or design herein shown other than as described in the appended claims.

What is claimed is:

1. A disk drive comprising:
   a drive housing; and
   a storage disk that is rotatably coupled to the drive housing, the storage disk being susceptible to vibration, the storage disk including (i) a first substrate formed from a first material having a first composition, wherein the first substrate has a first inner surface, (ii) a spaced-apart second substrate formed from a second material having a second composition, wherein the second substrate has a second inner surface, (iii) a damping layer including a viscoelastic material that is positioned at least partially between the first substrate and the second substrate, wherein the damping layer contacts both the first inner surface and the second inner surface, and (iv) a rigid substrate spacer positioned at least partially between the first substrate and the second substrate, the substrate spacer being formed from a third material having a third composition that is different from the first composition and the second composition.

2. The disk drive of claim 1 wherein the first substrate has a first thickness and the second substrate has a second thickness that is substantially similar to the first thickness.

3. The disk drive of claim 1 wherein the first substrate has a first natural frequency and the second substrate has a second natural frequency that is different from the first natural frequency.

4. The disk drive of claim 3 wherein the first natural frequency is at least approximately 1% greater than the second natural frequency.

5. The disk drive of claim 1 wherein the first substrate has a first thickness and the second substrate has a second thickness that is different than the first thickness.

6. The disk drive of claim 1 wherein the first composition is substantially identical to the second composition.

7. The disk drive of claim 1 wherein each of the substrates includes an aluminum alloy.

8. The disk drive of claim 1 wherein the first composition is different than the second composition.

9. The disk drive of claim 8 wherein the first material has a first specific modulus and the second material has a second specific modulus that is at least approximately 5% greater than the first specific modulus.

10. The disk drive of claim 8 wherein the first substrate has a first thickness and the second substrate has a second thickness that is at least approximately 10% greater than the first thickness.

11. The disk drive of claim 1 wherein storage disk has an inner diameter, and wherein the rigid substrate spacer is positioned near the inner diameter.

12. The disk drive of claim 1 further comprising a disk clamp including an upper portion and a lower portion, the storage disk being positioned between the upper and lower portions, and wherein the rigid substrate spacer is at least partially positioned directly between the upper and lower portions.

13. The disk drive of claim 1 wherein the rigid substrate spacer includes material formed using a welding operation.

14. The disk drive of claim 1 wherein the rigid substrate spacer includes an adhesive material.

15. The disk drive of claim 1 wherein the rigid substrate spacer is formed substantially from a metal.

16. The disk drive of claim 1 wherein the storage disk has an outer diameter, the rigid substrate spacer being positioned near the outer diameter.

17. The disk drive of claim 1 wherein the storage disk includes a plurality of rigid substrate spacers, and the storage disk has an inner diameter and an outer diameter, wherein one of the rigid substrate spacers is positioned near the inner diameter and one of the rigid substrate spacers is positioned near the outer diameter.

18. The disk drive of claim 1 wherein at least one of the substrates includes a recess near the inner diameter, and wherein the rigid substrate spacer is positioned at least partially within the recess to maintain a substantially consistent spacing between the first substrate and the second substrate.

19. The disk drive of claim 18 wherein the rigid substrate spacer include material formed using a welding operation.

20. The disk drive of claim 1 wherein the storage disk has an inner diameter, and an outer diameter, and wherein the rigid substrate spacer includes a connector that is positioned at least partially between the substrates, the connector at least partially connecting one of the inner diameter and the outer diameter of the storage disk.

21. The disk drive of claim 20 wherein the connector includes a material formed during a welding process.

22. The disk drive of claim 20 wherein the connector includes adhesive material.

23. The disk drive of claim 1 wherein the storage disk has an outer diameter, and wherein the storage disk includes a flexible band that connects a portion of the first substrate to a portion of the second substrate around at least part of the outer diameter.

24. The disk drive of claim 1, wherein the rigid substrate spacer contacts both the first inner surface and the second inner surface.

25. The disk drive of claim 1, wherein the storage disk is configured to store data magnetically.

26. A disk drive comprising:
    a drive housing; and
    a storage disk that is rotatably coupled to the drive housing, the storage disk comprising (i) a first substrate formed from a first material having a first composition, (ii) a spaced-apart second substrate formed from a second material having a second composition, (iii) a damping layer including a viscoelastic material that is positioned at least partially between the first substrate and the second substrate, and (iv) a rigid substrate spacer positioned at least partially between the first substrate and the second substrate, the substrate spacer being formed from a third material having a third composition that is different from the first composition and the second composition, wherein the first substrate has a first inner surface that at least partially contacts the damping layer, and the first substrate includes a depression in the first inner surface so that the depression does not contact the damping layer.

27. A disk drive comprising:

a drive housing; and a storage disk that is rotatably coupled to the drive housing, the storage disk being susceptible to vibration, the storage disk including (i) a first substrate formed from a first material having a first composition, wherein the first substrate has a first inner surface, (ii) a spaced-apart second substrate formed from a second material having a second composition that is different than the first composition, wherein the second substrate has a second inner surface, and (iii) a damping layer including a viscoelastic material that is positioned at least partially between the first substrate and the second substrate, wherein the damping layer contacts both the first inner surface and the second inner surface.

28. The disk drive of claim 27 further comprising a rigid substrate spacer positioned at least partially between the first substrate and the second substrate, the rigid substrate spacer maintaining a substantially consistent spacing between the first substrate and the second substrate.

29. The disk drive of claim 28 wherein the rigid substrate spacer is formed from a third material having a third composition that is different from the first composition and the second composition.

30. The disk drive of claim 28 wherein storage disk has an inner diameter, and wherein the rigid substrate spacer is positioned near the inner diameter.

31. The disk drive of claim 28 further comprising a disk clamp including an upper portion and a lower portion, the storage disk being positioned between the upper and lower portions, and wherein the rigid substrate spacer is at least partially positioned directly between the upper and lower portions.

32. The disk drive of claim 28 wherein the rigid substrate spacer includes material formed using a welding operation.

33. The disk drive of claim 28 wherein the rigid substrate spacer includes an adhesive material.

34. The disk drive of claim 28 wherein the rigid substrate spacer is formed substantially from a metal.

35. The disk drive of claim 28 wherein the storage disk has an outer diameter, the rigid substrate spacer being positioned near the outer diameter.

36. The disk drive of claim 28 wherein at least one of the substrates includes a recess near the inner diameter, and wherein the rigid substrate spacer is positioned at least partially within the recess to maintain a substantially consistent spacing between the first substrate and the second substrate.

37. The disk drive of claim 28 wherein the storage disk has an inner diameter, and an outer diameter, and wherein the rigid substrate spacer includes a connector that is positioned at least partially between the substrates, the connector at least partially connecting one of the inner diameter and the outer diameter of the storage disk.

38. The disk drive of claim 37 wherein the connector includes a material formed during a welding process.

39. The disk drive of claim 37 wherein the connector includes an adhesive material.

40. The disk drive of claim 27 wherein the storage disk includes a plurality of rigid substrate spacers that maintain a substantially consistent spacing between the first substrate and the second substrate, the storage disk has an inner diameter and an outer diameter, and one of the rigid substrate spacers is positioned near the inner diameter and one of the rigid substrate spacer is positioned near the outer diameter.

41. The disk drive of claim 27 wherein the first substrate has a first thickness and the second substrate has a second thickness that is substantially similar to the first thickness.

42. The disk drive of claim 27 wherein the first substrate has a first naturally frequency and the second substrate has a second natural frequency that is different than the first natural frequency.

43. The disk drive of claim 27 wherein the first material has a first specific modulus and the second material has a second specific modulus that is at least approximately 5% greater than the first specific modulus.

44. The disk drive of claim 27 wherein the first substrate has a first thickness and the second substrate has a second thickness that is at least approximately 1% greater than the first thickness.

45. The disk drive of claim 27 wherein the storage disk has an outer diameter, and wherein the storage disk includes a flexible band that connectors a portion of the first substrate to a portion of the second substrate around at least part of the outer diameter.

46. The disk drive of claim 27 wherein the first inner surface at least partially contacts the damping layer, and the first substrate includes a depression in the first inner surface so that the depression does not contact the damping layer.

47. The disk drive of claim 28, wherein the rigid substrate spacer contacts both the first inner surface and the second inner surface.

48. The disk drive of claim 27, wherein the storage disk is configured to store data magnetically.

49. A disk drive comprising:

a drive housing; and a storage disk that is rotatably coupled to the drive housing, the storage disk including:

a first substrate, wherein the first substrate has a first inner surface, a spaced-apart second substrate, wherein the second substrate has a second inner surface, a damping layer including a viscoelastic material that is positioned at least partially between the first substrate and the second substrate, wherein the damping layer contacts both the first inner surface and the second inner surface, and a rigid substrate spacer positioned at least partially between the first substrate and the second substrate, the substrate spacer being formed from a composition that is different from compositions of the first substrate and the second substrate, wherein the rigid substrate spacer contacts both the first inner surface and the second inner surface.

50. The disk drive of claim 49, wherein the storage disk is configured to store data magnetically.

51. The disk drive of claim 49 wherein storage disk has an inner diameter, and wherein the rigid substrate spacer is positioned near the inner diameter.

52. The disk drive of claim 49 further comprising a disk clamp including an upper portion and a lower portion, the storage disk being positioned between the upper and lower portions, and wherein the rigid substrate spacer is at least partially positioned directly between the upper and lower portions.

53. The disk drive of claim 49 wherein the storage disk includes a plurality of rigid substrate spacers, and the storage disk has an inner diameter and an outer diameter, wherein one of the rigid substrate spacers is positioned near the inner diameter and one of the rigid substrate spacers is positioned near the outer diameter.

54. The disk drive of claim 49 wherein at least one of the substrates includes a recess near the inner diameter, and wherein the rigid substrate spacer is positioned at least partially within the recess to maintain a substantially consistent spacing between the first substrate and the second substrate.

* * * * *

UNITED STATES PATENT AND TRADEMARK OFFICE
CERTIFICATE OF CORRECTION

PATENT NO. : 7,573,674 B1  Page 1 of 1
APPLICATION NO. : 11/314515
DATED : August 11, 2009
INVENTOR(S) : Wittig et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 767 days.

Signed and Sealed this

Seventh Day of September, 2010

David J. Kappos
*Director of the United States Patent and Trademark Office*